No. 733,545. PATENTED JULY 14, 1903.
A. D. FREDERICK.
CREAM SEPARATOR AND CHURN.
APPLICATION FILED MAR. 24, 1903.
NO MODEL.
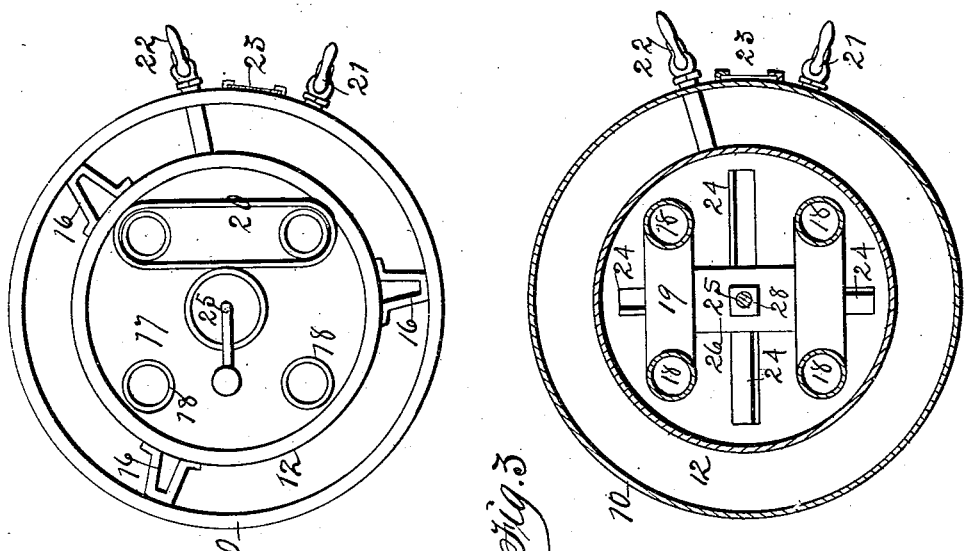
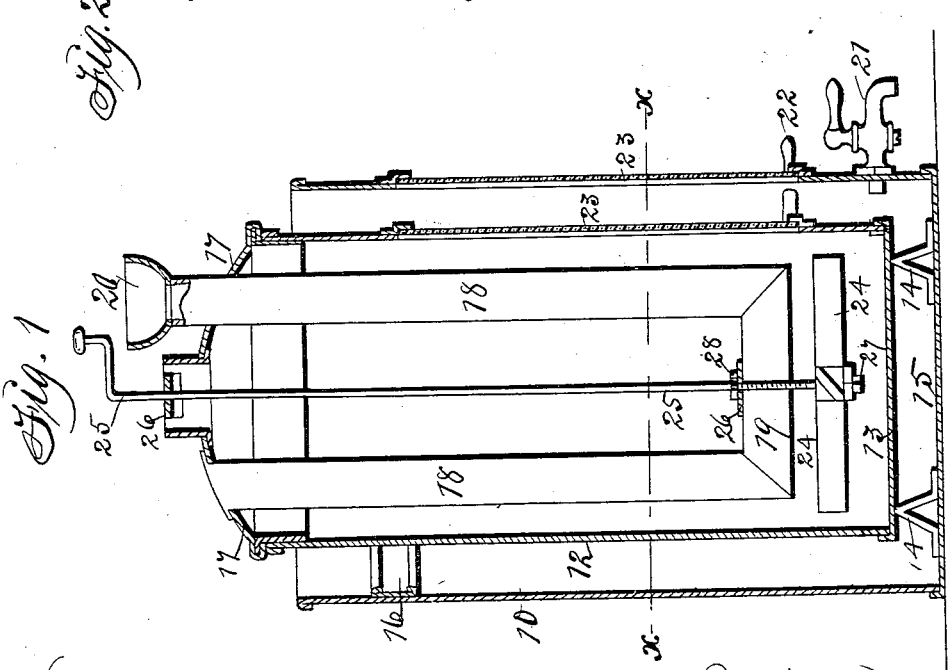

No. 733,545. Patented July 14, 1903.

UNITED STATES PATENT OFFICE.

ALONZO D. FREDERICK, OF MARSHALLTOWN, IOWA.

CREAM-SEPARATOR AND CHURN.

SPECIFICATION forming part of Letters Patent No. 733,545, dated July 14, 1903.

Application filed March 24, 1903. Serial No. 149,411. (No model.)

*To all whom it may concern:*

Be it known that I, ALONZO D. FREDERICK, a citizen of the United States, residing at Marshalltown, in the county of Marshall and State of Iowa, have invented a new and useful Cream-Separator and Churn, of which the following is a specification.

My object is to separate cream from milk when taken warm and fresh from cows and placed in the separator, to regulate the temperature as required, to facilitate separating the cream and churning it in the separator, to expedite the making of butter, and saving time and labor in making butter.

My invention consists in the combination of a cream-separator and a rotary-dasher churn, as hereinafter set forth, pointed out in my claims, and illustrated in the accompanying drawings, in which—

Figure 1 is a vertical longitudinal section of my invention, showing the positions of the different operative parts relative to each other and the double-walled vessel. Fig. 2 is a top view of the vessel and the removable cover with which the tubes and dasher are combined. Fig. 3 is a transverse sectional view of the lower portion of the churn, that shows the dasher-blades under the plurality of tubes that remain stationary to serve as breakers to coact with the rotary dasher in churning cream.

The numeral 10 designates the outer wall, and 12 the inner wall, of the vessel, between which walls there is an annular chamber adapted for retaining cold water. The bottom 13 of the inner wall has fixed supports 14, that retain it elevated relative to the bottom 15 of the outer wall, and 16 are braces fixed between the top portions of the two concentric walls. The inner wall extends above the outer wall. A double-walled vessel is thus provided for retaining milk and allowing water to be filled in and circulated in the annular chamber produced by the double wall. A concavo-convex cover 17 is fitted to the top of the inner wall and provided with an opening in its apex, through which milk is to be filled into the vessel and the dasher-stem extended downward. Straight tubes 18 are fixed in apertures in the cover and connected by horizontal sections 19 at their bottoms, and to the tops of two of the tubes is fitted a funnel 20 for filling water into the tubes. A faucet 21 is provided at the bottom of the outer wall for drawing off water from the annular chamber, and a faucet 22 is connected with the double wall for drawing milk from the vessel. In each wall is a window 23, through which the milk and cream may be seen, as required for observing cream when it has gathered on top of the milk.

A rotary dasher 24 is detachably connected with the bottom of a stem 25, preferably a metal rod, and bearings are formed in braces 26, fixed to the upper and lower portions of the tubes 18, for supporting the stem in perpendicular position in the center of the vessel, as shown in Fig. 1, or in any suitable way. The top of the stem has an integral handle for rotating the dasher by hand, or gearing may be connected with the cover and stem in a common way for operating the dasher. The lower end portion of the stem 25 is screw-threaded, and the dasher is detachably connected therewith by means of a nut 27, and the stem is adjustably connected with the bearings 26 and the lower ends of the tubes 18 by a nut 28 on the stem, as shown in Fig. 1, or in any suitable way, as required for raising and lowering the dasher relative to the tubes and the bottom of the vessel.

In the practical operation of my invention the milk can be readily poured into the vessel and water, cold or warm, into the tubes 18 through the funnel 20, and when the tubes are full the water will overflow from the tubes through the open tops of the two tubes that terminate at the top of the cover and then down over the incline of the cover into the annular chamber between the two walls of the vessel for removing animal heat from the milk, as required to produce the proper temperature for separating the cream therefrom, and then hastening the separation by operating the dasher. When the cream is separated from the milk and has risen to the top of the milk, the milk can be readily drawn off through the faucet 22 and the dasher then operated for churning the cream and making butter. To regulate the temperature of the cream, cold water or hot water may be filled into the tubes and the space between the double walls. It is obvious the cover, the tubes, and the dasher can be lifted from the vessel, as required to facilitate cleaning them and the vessel.

Having thus described the purpose, construction, and operation of my invention, its practical utility will be readily understood by persons familiar with the art to which it pertains, and what I claim as new, and desire to secure by Letters Patent, is—

1. In a cream-separator and churn, a double-walled vessel, a removable cover fitted in the top of said vessel, a plurality of tubes fixed to said cover for circulating water and to serve as breakers and a rotatable dasher, arranged and combined to operate in the manner set forth for the purposes stated.

2. In a cream-separator and churn, a double-walled vessel, a removable cover fitted to the vessel, a plurality of tubes fixed to said cover for circulating water and to serve as breakers, a rotatable dasher and means for adjusting the dasher relative to the lower ends of the tubes, arranged and combined to operate in the manner set forth for the purposes stated.

3. A cream-separator and churn comprising a double-walled vessel, a faucet for drawing off milk from the lower part of the vessel, means for drawing off water from the bottom of the space between the walls of the vessel, a removable cover fitted in the top of the vessel, a plurality of open-topped tubes fixed in the cover and connected at their lower ends, means for filling water into the tubes, a rotatable dasher fitted in the bottom of the vessel, bearings for the dasher-stem fixed to the tubes carried by the cover and means for operating the dasher, arranged and combined to operate in the manner set forth for the purposes stated.

ALONZO D. FREDERICK.

Witnesses:
J. M. BISHOP,
F. F. FREDERICK.